April 8, 1924.                                    1,489,473
W. E. WILSON
CURVED PALETTE AND PALETTE TABLE
Filed Feb. 3, 1921            2 Sheets-Sheet 1

Fig. 3ª

Witness:
John Enders

Inventor:
William E. Wilson,
By Wallace R. Lane
Atty.

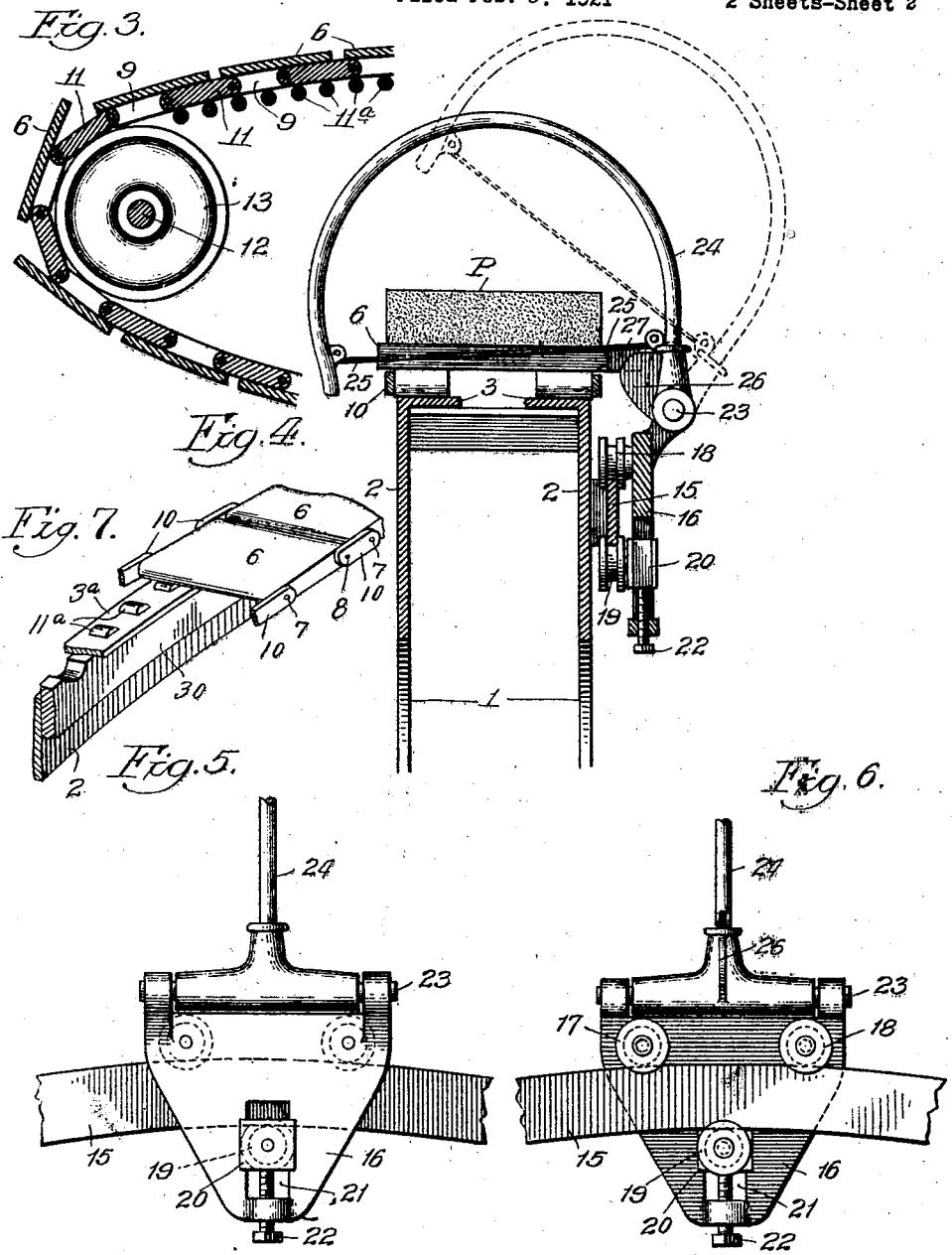

Patented Apr. 8, 1924.

1,489,473

UNITED STATES PATENT OFFICE.

WILLIAM E. WILSON, OF MASON CITY, IOWA.

CURVED PALETTE AND PALETTE TABLE.

Application filed February 3, 1921. Serial No. 442,074.

*To all whom it may concern:*

Be it known that I, WILLIAM E. WILSON, a citizen of the United States, residing at Mason City, Iowa, have invented certain new and useful Improvements in Curved Palettes and Palette Tables, of which the following is a specification.

My invention relates to means for forming plastic ware such as bricks and tile in a curved form, rapidly, and without the cracks commonly formed by methods heretofore known.

Among the objects of my invention are to provide a structure by means of which curved tiles, bricks and like articles can be readily formed; to form articles of the character stated without undue strain on, and consequent tearing and cracking of, the material; to construct a machine for the purpose stated in which the cutter element may move with, and in a course parallel to, the material to be cut; to construct a machine of the character stated by means of which the cutter element may be caused to sever the plastic material in planes perpendicular to the axis of the plastic stream; and such further objects, advantages and capabilities as will later more fully appear.

My invention further resides in the combination, construction and arrangement of parts illustrated in the accompanying drawings, and while I have shown therein a preferred embodiment, I desire the same to be understood as illustrative only and not as limiting my invention.

Figure 1:
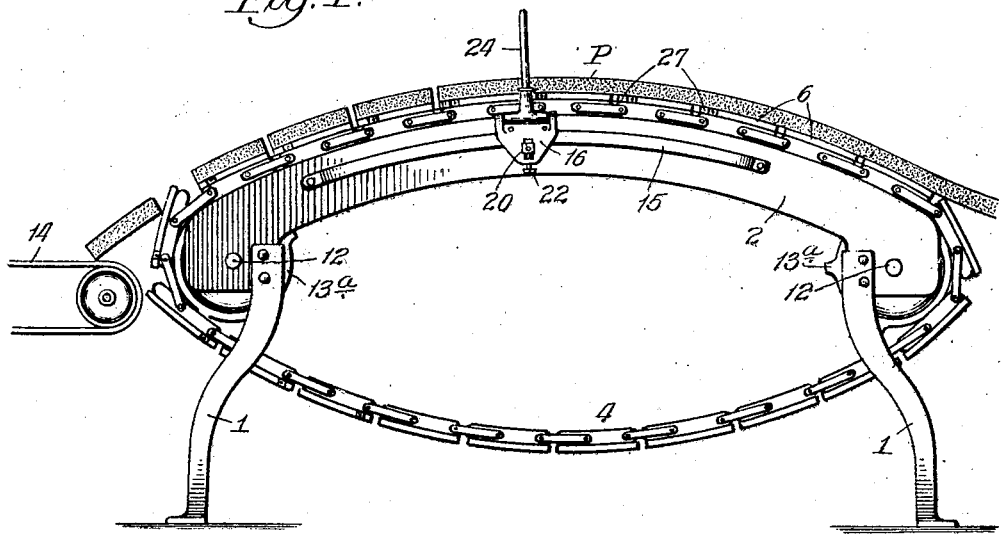
Figure 2:
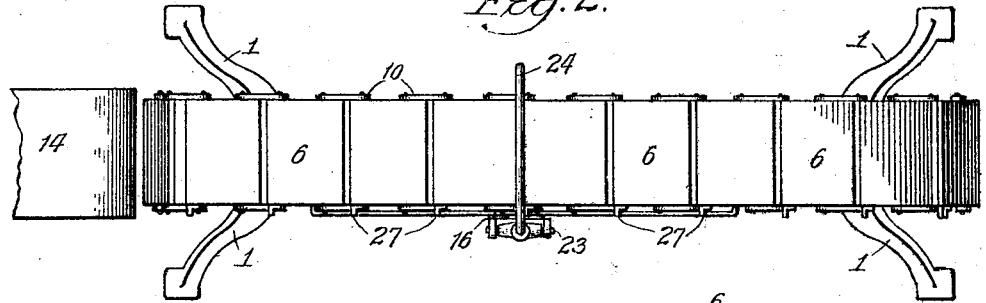
Figure 2:
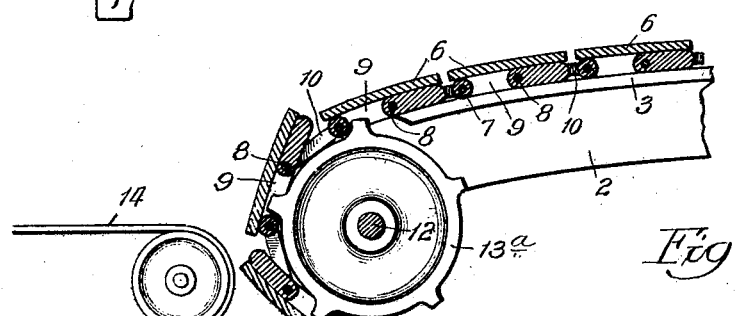

In the accompanying drawings, Fig. 1 shows a side elevation of one form of my improved device, with a stream of plastic material passing thereover. Fig. 2 shows a plan view of the apparatus shown in Fig. 1. Fig. 3 shows a fragmentary longitudinal section of my new apparatus. Fig. 3ª is a view similar to Fig. 3 showing a modified form of construction. Fig. 4 shows a transverse section of this apparatus. Figs. 5 and 6 show outer and inner face views of the cutter carrying apparatus, designed to carry the cutter in a path parallel to the path of movement of the plastic material. Fig. 7 is a fragmentary perspective view illustrating how the curvature of the flexible conveyor belt may be adjusted.

My new apparatus comprises a table having legs 1 and side bars 2, which latter may have their upper edges bent over to form flanges 3, (see Figs. 3ª and 4) on which rests and moves the flexible conveyor belt 4. The upper edges of the side bars 2, together with their flanges 3 are curved to substantially conform to the curvature of the palettes 6, which are pivotally secured at 7 and 8 to links 9 and 10. Rollers are provided to support the palettes 6 and reduce the friction of the belt as it moves over the top of the table. The structure shown in Fig. 3 is, however, preferred to that shown in Fig. 3ª. In this structure the conveyor belt has blocks 11 connecting the links 9 and supporting the palettes 6, said blocks 11 being supported by rollers 11ª mounted either on the side members 2 or on members secured thereto. Preferably the rollers 11ª are carried by flexible supporting means capable of having its curvature readily adjusted to vary the curvature of the conveyor belt. Said rollers take the places of the flanges 3. The rollers 11ª may be mounted in various ways so that the curvature of the palette belt may be adjusted. One of these ways is to have the rollers carried by a flexible band of iron 3ª which may rest on wooden strips 30 whose upper edges are curved to desired radii so that the strips of iron and the palette belt are caused to assume the desired curvature.

At the ends of the table are mounted bars 12, carrying pulleys 13 or sprocket wheels 13ª which are adapted to advance the palette belt 4 and keep the same definitely in position. It will be noticed that the pivots 8 are located substantially centrally of the length of the palette, which makes it easier for the belt to pass over the pulleys 13 or sprocket wheels 13ª and also raises the rear end of the palette so that it is easy to get hold of the brick or tile to move it from the palette to the transfer mechanism 14, by means of which it may be transferred to a desired location. It will of course be understood that the palettes 6 may be made of any desired dimensions, to correspond with the various dimensions of the plastic ware to be formed thereon. As indicated above, my invention comprises also the idea of forming the palettes and table as a flexible construction so that the curvature may be varied to produce ware having different curvatures.

One of the side bars 2 is provided with a curved guide-bar 15, adapted to support the cutter carrier 16, provided with the roller bearings 17, 18 and 19. It will be noted that the latter of these is mounted on a block 20 adjustable in a slot 21 by means of a screw 22. If desired, this latter may be provided with a lock nut to hold the parts in proper position. It will be seen from the above, that, when the rollers 17 and 18 have been placed on track 15 and screw 22 has been adjusted to bring roller 19 into engagement with the track, the cutter carrier 16 will be held in fixed relation thereto, so that the same may move along the track or guide 15 and carry the cutter in a course parallel to the direction of travel of the palettes.

Pivotally mounted at 23 on the carrier 16 is a frame 24, carrying a cutter member 25, which preferably consists of a piece of wire, such as piano wire, though in some instances a blade will be preferable and will be substituted for the wire 25. On an inner face of the frame 24 is a projection 26, adapted to engage co-operating projections 27 at the forward ends of the palettes. When the projection 26 engages projection 27 cutter support 16 is caused to move forwardly at the same rate as the plastic material carried by the palettes and the operator may then push the frame 24 over so that cutter 25 would pass down through the plastic material P and between adjacent ends of the palettes. By then pulling backwardly on the frame 24 the cutter may be raised to the dotted line position in Fig. 4 and moved to the right as shown in Fig. 1 to engage the next projection 27 so that the next cut can be made. It will be evident from the above that, when projection 26 engages projection 27 and the cutter carrier moves along with the palette belt, the cutter member, when actuated, will move in a direction perpendicular to the axis of the plastic stream or, in other words, along a radial plane thereof.

The space between the cut-off section of plastic material P has been shown somewhat exaggerated in Fig. 1 for the sake of clearness. It will be understood that the transfer of the sections of plastic material from the palette table to the transfer mechanism 14 may be accomplished either manually or automatically, the former being considered preferable. Since the upper surface of the palette belt 4 is a substantially continuous curved surface the plastic material will readily adapt itself to the curvature, whether it be in solid form for the making of bricks or in a tubular form for the making of tiles.

It is of course understood that the specific description of structure set forth above may be departed from without departing from the spirit of my invention as set forth in this specification and the appended claims.

Having now described my invention, I claim:

1. In a plastic forming machine, a curved table, an endless conveyor belt thereon, comprising a plurality of pivotally connected curved palettes, adapted to be moved over the surface of the curved table, and a cutter member mounted laterally adjacent the side of the table and adapted to move in a course parallel to the belt.

2. In a conveyor belt, a plurality of curved palettes and means pivotally connected with one palette near one of its extremities and with the next adjacent palette near its middle so that as the belt passes over the surface of the supporting wheel or pulley there will be a sudden change of direction thereof and a raising of one end of the palette above the adjacent end of the next palette.

3. A plastic forming table comprising a supporting member having a curved supporting top, a cutter guide secured thereto and curved in a direction substantially parallel to the said table top and a cutter member carried by the guide and adapted to move therealong in a direction substantially parallel to the table top.

4. In a plastic forming machine, a supporting member, a curved guide thereon intermediate the ends thereof, and a cutter carrier movable along said guide.

5. In a plastic forming machine, a supporting member having a curved supporting surface, a curved guide secured to said supporting member and extending in a direction substantially parallel to the curved supporting surface, and a cutter carrier having wheels to engage said guide and guide the carrier in a path substantially parallel to the said curved supporting surface.

6. In a plastic forming machine, a supporting member, a curved guide thereon, a cutter carrier movable along said guide and provided with wheels to engage the guide and cause the carrier to move in a curved path.

7. In a plastic forming table, a conveyor belt having its upper surface curved and traveling in a curved path, in combination with means to support the belt and means to adjust said supporting means to vary the curvature of the path of travel of the belt.

8. A cutting device for a plastic forming machine comprising a curved cutter guide secured to the side of the machine, a cutter carrier movable along said guide and a cutter carried by said carrier.

9. In a plastic forming table, a conveyor belt traveling in a curved path, in combination with a cutter mechanism adapted to travel in the same direction as or in a contrary direction to the belt, said belt having abutments to be engaged by the cutter mechanism and the cutter mechanism having an abutment to engage the first named abutments so that the cutter will be advanced at the same speed as the belt, said abutments being out of engagement when the cutter mechanism is in inoperative position.

10. In a structure of the character described, a stand having a curved supporting means, a conveyor belt, comprising curved palettes, movable along said stand to carry the material to be acted on, and a cutter carrying mechanism adapted to move substantially parallel to the path of movement of the said material, said cutter being carried forward by the conveyor belt.

11. In a plastic forming table, a conveyor belt having its uppermost surface curved and traveling in a curved path, in combination with a cutter mechanism adapted to travel in the same or in a contrary direction to the belt, but in a path parallel thereto, said cutter being carried forward by the conveyor belt.

12. In a plastic forming table, a conveyor belt having its upper surface curved and traveling in a curved path, in combination with means to vary the curvature of the path of travel of the belt.

In witness whereof, I hereunto subscribe my name to this specification in the presence of two witnesses.

WM. E. WILSON.

Witnesses:
ELMER A. ELY,
E. R. DUNLOP.